(12) United States Patent
Jiang et al.

(10) Patent No.: US 9,488,370 B2
(45) Date of Patent: Nov. 8, 2016

(54) ARRANGEMENT STRUCTURE SUITABLE FOR INVERTED PULVERIZED COAL BOILER WITH ULTRA-HIGH STEAM TEMPERATURE STEAM PARAMETERS

(75) Inventors: Minhua Jiang, Beijing (CN); Ping Xiao, Beijing (CN); Jianzhong Jiang, Beijing (CN); Li Zhong, Beijing (CN)

(73) Assignee: Huaneng Clean Energy Research Institute, Beijing (CN)

( * ) Notice: Subject to any disclaimer, the term of this patent is extended or adjusted under 35 U.S.C. 154(b) by 842 days.

(21) Appl. No.: 13/577,825

(22) PCT Filed: Nov. 18, 2011

(86) PCT No.: PCT/CN2011/082486
§ 371 (c)(1),
(2), (4) Date: Aug. 8, 2012

(87) PCT Pub. No.: WO2012/139383
PCT Pub. Date: Oct. 18, 2012

(65) Prior Publication Data
US 2013/0239909 A1    Sep. 19, 2013

(30) Foreign Application Priority Data
Apr. 11, 2011    (CN) .......................... 2011 1 0090155

(51) Int. Cl.
F22D 1/38    (2006.01)
F22B 29/06    (2006.01)
F23D 1/00    (2006.01)
F22B 1/18    (2006.01)
(Continued)

(52) U.S. Cl.
CPC ................. *F22D 1/38* (2013.01); *F22B 21/02* (2013.01); *F22B 29/067* (2013.01); *F22B 35/001* (2013.01); *F22G 7/12* (2013.01); *F23C 3/00* (2013.01); *F23C 5/08* (2013.01); *F23D 1/00* (2013.01); *F23C 2900/03006* (2013.01)

(58) Field of Classification Search
None
See application file for complete search history.

(56) References Cited

U.S. PATENT DOCUMENTS 2,737,930 A * 3/1956 Rowand .................... F22G 5/20
                                                                122/479.2
2,830,440 A * 4/1958 Durham ......................... 60/653
(Continued)

FOREIGN PATENT DOCUMENTS

CN    2093963 U    1/1992
CN    2114091 U    8/1992
(Continued)

*Primary Examiner* — Gregory Huson
*Assistant Examiner* — Eric Gorman
(74) *Attorney, Agent, or Firm* — Jenkins, Wilson, Taylor & Hunt, P.A.

(57) ABSTRACT

The disclosure provides an arrangement structure suitable for an inverted pulverized coal boiler with ultra-high steam temperature steam parameters, including a hearth, wherein the hearth is communicated with a middle uplink flue, and the top of the middle uplink flue is communicated with that of a tail downlink flue. In the structure, the hearth is connected with the middle uplink flue by a hearth outlet horizontal flue at the bottom, so that the high-temperature gas is drained to a low elevation and then flows upwards through the middle uplink flue; a final heating surface may be arranged at the low position of the hearth outlet horizontal flue and the middle uplink flue so as to reduce the length of the high-temperature steam pipeline between the final heating surface and the steam turbine, lower the manufacturing cost of the boiler as well as the frication and radiation loss of the pipe.

17 Claims, 3 Drawing Sheets

(51) Int. Cl.
*F22G 1/04* (2006.01)
*F22G 7/12* (2006.01)
*F22G 7/14* (2006.01)
*F23C 3/00* (2006.01)
*F23C 5/08* (2006.01)
*F22B 21/02* (2006.01)
*F22B 35/00* (2006.01)

(56) References Cited

U.S. PATENT DOCUMENTS

| | | | | |
|---|---|---|---|---|
| 2,869,520 | A * | 1/1959 | Paulison, Jr. | 122/479.6 |
| 2,922,406 | A * | 1/1960 | Zoller | 122/478 |
| 2,926,636 | A * | 3/1960 | Paulison, Jr. | 122/479.2 |
| 2,942,587 | A * | 6/1960 | Smith | 122/478 |
| 2,947,288 | A * | 8/1960 | Nickel | 122/478 |
| 2,948,267 | A * | 8/1960 | Koch et al. | 122/481 |
| 2,960,972 | A * | 11/1960 | Schaap | 122/478 |
| 3,001,514 | A * | 9/1961 | Forsman | 122/510 |
| 3,028,844 | A * | 4/1962 | Durham et al. | 122/479.4 |
| 3,040,719 | A * | 6/1962 | Dickey | F22B 35/002 |
| | | | | 122/479.1 |
| 3,136,300 | A * | 6/1964 | Dickey | 122/479.1 |
| 3,161,180 | A * | 12/1964 | Durham et al. | 122/479.5 |
| 3,205,870 | A * | 9/1965 | Durham et al. | 122/479.5 |
| 3,447,492 | A * | 6/1969 | Rickard et al. | 110/185 |
| 3,579,990 | A * | 5/1971 | Grams | 60/657 |
| 3,643,634 | A * | 2/1972 | Soh | 122/483 |
| 4,244,327 | A * | 1/1981 | Ssinegurski | F22B 37/14 |
| | | | | 122/235.12 |
| 4,424,765 | A * | 1/1984 | Strohmeyer, Jr. | 122/4 D |
| 4,442,783 | A * | 4/1984 | Pajonas et al. | 110/347 |
| 4,442,797 | A * | 4/1984 | Strohmeyer, Jr. | 122/4 D |
| 4,592,293 | A * | 6/1986 | Toyama et al. | 110/347 |
| 5,943,865 | A * | 8/1999 | Cohen | 60/653 |
| 6,039,008 | A * | 3/2000 | Anderson | F22B 31/0084 |
| | | | | 122/4 D |
| 6,125,634 | A * | 10/2000 | Wittchow | F22B 37/008 |
| | | | | 60/678 |
| 6,253,552 | B1 * | 7/2001 | Peletz, Jr. | 60/649 |
| 2003/0101726 | A1 * | 6/2003 | Marin et al. | 60/677 |
| 2006/0236696 | A1 * | 10/2006 | Saviharju et al. | 60/643 |
| 2008/0276844 | A1 * | 11/2008 | Yamamoto et al. | 110/234 |
| 2010/0077946 | A1 * | 4/2010 | D'Agostini | 110/345 |
| 2010/0223926 | A1 * | 9/2010 | Orita et al. | 60/670 |
| 2014/0033712 | A1 * | 2/2014 | Jiang et al. | 60/653 |

FOREIGN PATENT DOCUMENTS

| | | |
|---|---|---|
| CN | 2259552 Y | 8/1997 |
| CN | 201521941 U | 7/2010 |
| CN | 201526948 U | 7/2010 |
| CN | 201680378 U | 12/2010 |
| CN | 102147105 A | 8/2011 |
| CN | 202032544 U | 11/2011 |
| EP | 1 314 929 A2 | 5/2003 |
| GB | 983641 A | 2/1965 |
| JP | 2002/243101 A | 8/2002 |
| WO | WO-2007/077293 A1 | 7/2007 |

* cited by examiner

ARRANGEMENT STRUCTURE SUITABLE FOR INVERTED PULVERIZED COAL BOILER WITH ULTRA-HIGH STEAM TEMPERATURE STEAM PARAMETERS

CROSS-REFERENCE TO RELATED APPLICATIONS

This application is filed under the provisions of 35 U.S.C. §371 and claims the priority of International Patent Application No. PCT/CN2011/082486 filed on Nov. 18, 2011, and of Chinese Patent Application No. 201110090155.5 filed on Apr. 11, 2011. The disclosures of the foregoing international patent application and Chinese patent application are hereby incorporated by reference herein in their respective entireties.

TECHNICAL FIELD OF THE INVENTION

The invention relates to the field of boiler equipment, in particular to an arrangement structure suitable for an inverted pulverized coal boiler with ultrahigh steam temperature steam parameters.

BACKGROUND OF THE INVENTION

Pulverized coal boiler generator set, as the core technology of thermal power generation, experiences one hundred years of development history. From the subcritical to the supercritical, then to the ultra-supercritical, China's coal-fired power technology gets a rapid development in recent years. The rapid development of ultra-supercritical coal-fired power technology and the improvement of unit efficiency are the most cost-effective way to realize energy saving and emission reduction and to reduce carbon dioxide emission.

At present, the generating efficiency of a subcritical single-reheat thermal power generating unit is about 37%, and the generating efficiency of a supercritical single-reheat thermal power generating unit is about 41%, and the generating efficiency of an ultra-supercritical single-reheat thermal power generating unit with the temperature of main steam and reheated stream of 600° C. is about 44%; if the steam parameter is further improved, the unit generating efficiency is expected to be further increased. When the temperature of main steam and reheated stream reaches an ultrahigh steam temperature steam parameter of 700° C. or above, the generating efficiency of a single-reheat thermal power generating unit is expected to reach above 48.5%, and the generating efficiency of a double-reheat thermal power generating unit is expected to reach above 51%. Therefore, an advanced ultra-supercritical thermal power generating unit technology with steam temperature reaching or exceeding 700° C. is actively carried out in China and other countries.

There are many important technical problems in the development of an advanced ultra-supercritical thermal power generating unit with ultra-high steam temperature steam parameters, i.e., the thermal power generating unit with main steam and reheat steam temperature of over 700° C. Two main technical difficulties lie in: the development of a high-temperature alloy material which can meet the application requirement of the advanced ultra-supercritical thermal power generating unit with the ultra-high steam temperature steam parameter, and the design optimization of such unit system in order to reduce construction cost.

The research shows that the super alloy material most likely to be used for the high-temperature part of the high steam temperature ultra-supercritical thermal power generating unit mainly is a nickel base alloy. However, the nickel base alloy material is very expensive, more than 10 times of the price of a present common iron base heat resistant alloy steel of level 600° C. According to the system deployment mode of a present common thermal power generating unit, if the nickel base alloy material is adopted, taking two 1000 MW ultra-supercritical unit as an example, just the cost of the four high-temperature pipelines between the main steam/ reheated steam and a steam turbine would be increased to about 2.5 billion RMB from the present 300 million RMB. In addition, the manufacturing cost is increased when the high-temperature parts of the boiler and the steam turbine adopt a heat resistant alloy, finally the overall cost of the advanced ultra-supercritical unit of level 700° C. would be greatly higher than that of the thermal power generating unit of level 600° C., which limits the application and promotion of the advanced ultra-supercritical thermal power generating unit.

In addition, although the common thermal power generating unit with the temperature of main steam and reheated steam of 600° C. or below can adopt a method of single-reheat or double-reheat steam, and the double-reheat method can improve the unit efficiency to a great extent, all national large-scale thermal power generating units adopt the single-reheat system, and few large-scale thermal power generating units adopt the double-reheat system at present. This is because the complexity of the unit system adopting the double-reheat technology is higher than that of the unit system adopting the single-reheat technology and the investment thereof is greatly increased, which limits the application of the double-reheat system. If the complexity and manufacturing cost of the double-reheat system can be reduced by optimizing the design of the unit system, the realistic feasibility of the large-scale thermal power generating unit adopting the double-reheat system would be greatly improved.

Therefore, the point on how to optimize the design of the unit system and reduce the consumption of a high-temperature material plays a great role in implementing the application and promotion of the ultra-supercritical unit of ultra-high steam temperature, promoting the application of the double-reheat system to a large-scale thermal power generating unit and improving the generating efficiency of the unit.

A Chinese patent "A novel steam turbine generating unit" with patent number of 200720069418.3 discloses a method for reducing the length and cost of a high temperature and high pressure steam pipeline of a double-reheat unit by distributing a high shafting and a low shafting at different height, which provides another idea for solving this problem; however, since the high shaft formed by a high pressure cylinder and a generating unit needs to be arranged at a height of about 80 meters, serious problems such as shaking might be caused, and it is needed to solve the technical problems of support and foundation, thus this arrangement method has not been applied.

At present, the pulverized coal boilers generally adopt an arrangement mode of π-type boiler or tower type boiler, and a few adopt a T-type boiler, in which, the π-type boiler is the most common boiler arrangement mode adopted by the large/middle-scale thermal power generating unit, the feature lies in that the boiler consists of a hearth and a tail flue, and part of heating surfaces is arranged in a horizontal flue and a shaft of the tail flue. When the boiler is arranged in a form of π, the height of the hearth is shorter than that of the tower type boiler; therefore, the π-type boiler is good for the areas with strong earthquake and strong wind, with low manufacturing cost. However, since the eddy and disturbance of the flue gas is severe, the flow uniformity of the flue gas is poor, and it is easy to cause uneven heating of the heating surfaces, thus great temperature deviation is caused; and the boiler is heavily abraded when inferior fuel is combusted.

In a tower type boiler, all heating surfaces are arranged above the hearth, and the tail downward vertical flue is not provided with a heating surface.

Compared with the π-type boiler, the area occupied by the tower type boiler is smaller, which is suitable for the project with factory lacking land. Since the flue gas of the tower type boiler flows upwards, the dust in the flue gas flows slower and slower or sinks under gravity, thus the abrasion of the heating surfaces is greatly reduced. Besides, since the flue gas has good flow uniformity, the temperature deviation of the heating surfaces and working medium is smaller. Further, the tower type boiler has a simple structure, and the inflation center and the seal design of the boiler are easy to process, and the arrangement is compact; therefore, for the ultra-supercritical unit, the tower type boiler has certain advantages.

The T-type boiler divides the tail flue into two convection shaft flues of the same size, wherein the two convection shaft flues are arranged at two sides of the hearth symmetrically. In order to solve the problem of difficult arrangement of the tail heating surface of the π-type boiler, the height of the outlet smokestack of the hearth can be reduced to reduce the thermal deviation of the flue gas along the height; besides, the flow rate of the flue gas in the shaft can be reduced to reduce abrasion. However, the area occupied by the T-type boiler is greater than that occupied by the π-type boiler, the gas-water pipeline connection system is complex and the metal consumption is big, thus the T-type boiler is less applied at home.

No matter what arrangement mode the boiler adopts, the flue gas flow from the bottom to the top in the hearth; and due to the need of heat transfer, the high-temperature heating surfaces need to be arranged at an area with high flue gas temperature. For different boiler type, the area with high flue gas temperature is located above 50 to 80 meters, thus the high-temperature steam connection pipeline between the high-temperature heating surface outlet and the steam turbine is very long, and the cost is high, and the application of the double-reheat technology is limited. When the steam temperature reaches 700° C., which is an ultra-high steam temperature steam parameter, since the material cost per unit weight of the high-temperature steam connection pipeline is greatly increased, the point on how to reduce the length of the high-temperature steam connection pipeline and the manufacturing cost of the high-temperature boiler becomes a key technical problem to be solved.

SUMMARY OF THE INVENTION

To overcome the defects of the conventional art, the disclosure aims to provide an arrangement structure suitable for an inverted pulverized coal boiler with ultra-high steam temperature steam parameters to arrange a high-temperature superheater and a high-temperature reheater at a low elevation, thereby reducing the friction and radiation loss of the pipes, improving the efficiency of the power generating unit, and making the power generating unit possible to adopt the ultra-high steam temperature steam parameters and/or double reheat system.

To achieve the objective, the technical solution of the disclosure is as follows:

An arrangement structure suitable for an inverted pulverized coal boiler with ultra-high steam temperature steam parameters, includes a hearth, on the lower part of the side wall of which a hearth flue gas outlet is formed, and the hearth flue gas outlet is communicated with one end of a hearth outlet horizontal flue, while the other end of the hearth outlet horizontal flue is communicated with a middle uplink flue, and the top of the middle uplink flue is horizontally communicated with that of a tail downlink flue.

Furthermore, a slag discharge opening is formed at the bottom outlet of the hearth, and a platen heating surface is arranged on the lower part of the inside of the hearth, and convection heating surfaces consisting of an economizer, a superheater pipe set and a reheater pipe set are arranged inside the middle uplink flue, wherein a final superheater and a final reheater are respectively communicated with a corresponding high-pressure cylinder and a corresponding medium-pressure cylinder in the steam turbine through a high-temperature steam pipe, and a denitration system and an air preheater are arranged inside the tail downlink flue from top to bottom, and a tail flue gas outlet is formed below the side wall of the tail downlink flue.

Furthermore, the platen heating surface is arranged on the lower part of the inside of the hearth.

Furthermore, partial convection heating surfaces are arranged inside the hearth outlet horizontal flue and/or the tail downlink flue.

Furthermore, a hearth arch is arranged above the hearth flue gas outlet on the side wall of the hearth.

Furthermore, wall burners are arranged on the side wall of the hearth and/or top burners are arranged on the top of the hearth.

Furthermore, the convection heating surfaces in the middle uplink flue are arranged in series or in parallel.

Furthermore, the economizer, the superheater pipe set and the reheater pipe set of the convection heating surfaces are divided into two or more parallel convection heating surface sets between which a plurality of division walls are arranged, and a flue gas damper is arranged above the division walls.

Furthermore, the hearth is enclosed by a water cooled wall, which is a water cooled wall with spiral pipe coils, a rifled vertical pipe water cooled wall, and a normal vertical pipe water cooled wall or the combination of any two of them, besides, the overall flowing direction of water cooled working medium in the water cooled wall is from top to bottom or from bottom to top.

Furthermore, the platen heating surface is a superheated steam heating surface, a reheated steam heating surface, an evaporating heating surface or their combination.

Furthermore, the middle uplink flue is enclosed by a wall enclosure heating surface or a guard plate.

Furthermore, a slag discharge machine is arranged below the slag discharge opening.

Furthermore, a first dust discharge opening is formed at the bottom of the middle uplink flue, and a second dust discharge opening is formed at the bottom of the tail downlink flue.

The disclosure has the following advantages:

1. The hearth is connected with the middle uplink flue by the hearth outlet horizontal flue at the bottom, so that the high-temperature gas from the hearth is drained to a low elevation, and then flows upward through the middle uplink flue; a final heating surface may be arranged at the low position of the hearth outlet horizontal flue and the middle uplink flue to reduce the length of the high-temperature steam pipeline between the final heating surface and steam turbine, lower the manufacturing cost of the boiler as well as the on-way resistance and the thermal loss of the pipe, improve the efficiency of the power generating unit, and make the power generating unit possible to adopt the ultra-high steam temperature steam parameters (for example, steam temperature reaches 700° C.).

2. The length of the expensive high-temperature steam pipe for connecting the boiler with the steam turbine in the high-temperature steam pipe system is reduced so as to simplify the arrangement of the high-temperature steam pipe, consequently, and the power generating unit with an ultra-high steam temperature steam parameter and/or a higher temperature can adopt a steam double reheat system conveniently.

3. The superheater pipe set and the reheater pipe set are mainly arranged in the uplink flue, and the dust in the flue gas flows more slowly or drops downwards under the effect of the gravity, so as to reduce the wearing of the convection heating surfaces.

4. The denitration system and the air preheater are arranged in the tail downlink flue so as to effectively solve the problem that the denitration system is difficult to arrange in the "π" type boiler due to the limited space.

Besides the objectives, features and advantages mentioned above, the disclosure also has other objectives, features and advantages. The disclosure is further described below with reference to the drawings in detail.

BRIEF DESCRIPTION OF THE DRAWINGS

The drawings herein are used for the further understanding of the disclosure and constituting one part of the application, and the schematic embodiments of the disclosure and description thereof are used for the explanation of the disclosure and not limiting the disclosure. In the drawings.

Figure 1:
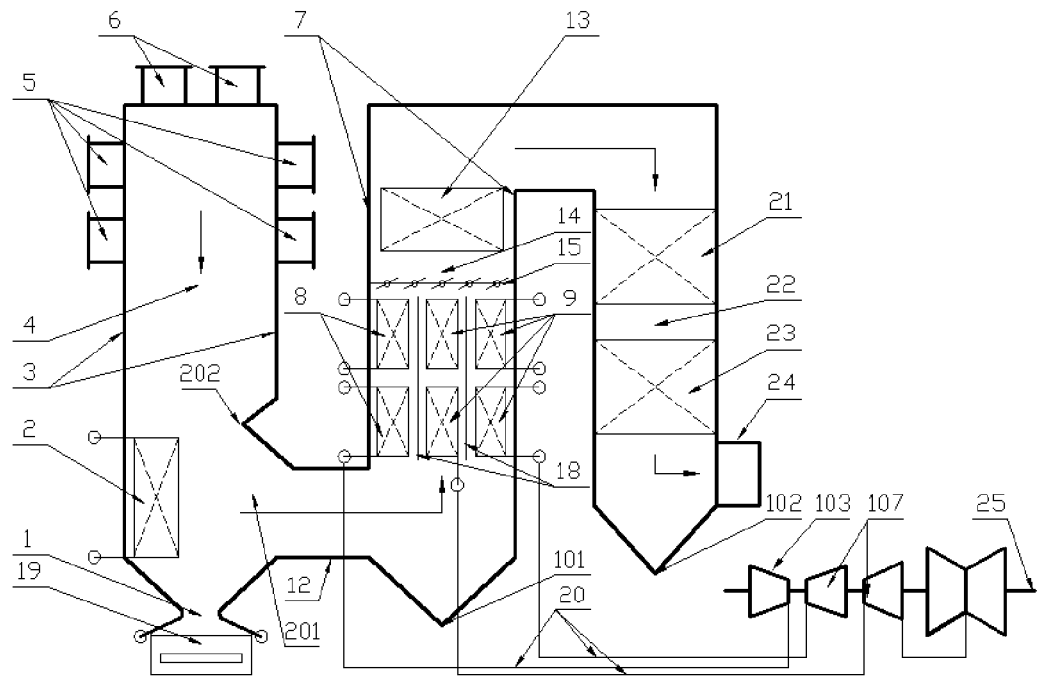
FIG. 1 is a diagram of an arrangement structure suitable for an inverted pulverized coal boiler with ultra-high steam temperature steam parameters in the first embodiment of the disclosure, the inside arrows representing the flowing direction of the flue gas.

In the disclosure, the meanings of the reference numbers in the drawing are as follows: 1, slag discharge opening; 2, platen heating surface; 3, water cooled wall; 4, hearth; 5, wall burner; 6, top burner; 7, wall enclosure heating surface; 8, superheater pipe set; 9, reheater pipe set; 12, hearth outlet horizontal flue; 13, economizer; 14, middle uplink flue; 15, flue gas damper; 18, division wall; 19, slag discharge machine; 20, high-temperature steam pipe; 21, air preheater; 22, tail downlink flue; 23, denitration system; 24, tail flue gas outlet; 25, steam turbine; 101, first dust discharge opening; 102, second dust discharge opening; 103, high-pressure cylinder; 107, medium-pressure cylinder set; 201, hearth flue gas outlet; 202, hearth arch.

DETAILED DESCRIPTION OF THE EMBODIMENTS

The embodiments of the disclosure are described below in conjunction with the drawings in detail, but the disclosure may be implemented in various different ways limited and enclosed by the claims of the disclosure.

First Embodiment

As shown in FIG. 1, the arrangement structure suitable for an inverted pulverized coal boiler with ultra-high steam temperature steam parameters provided by the disclosure includes a hearth 4 at the bottom outlet of which a slag discharge opening 1 is formed. A hearth flue gas outlet 201 is formed on the lower part of the side wall of the hearth 4 and is communicated with one end of the hearth outlet horizontal flue 12, while the other end of the hearth outlet horizontal flue 12 is communicated with a middle uplink flue 14, and the top of the middle uplink flue 14 is communicated with that of a tail downlink flue 22; a platen heating surface 2 is arranged on the lower part of the inside of the hearth 4, and convection heating surfaces consisting of an economizer 13, a superheater pipe set 8 and a reheater pipe set 9 are arranged inside the middle uplink flue 14, wherein a final superheater and a final reheater are respectively communicated with a corresponding high-pressure cylinder 103 and a corresponding medium-pressure cylinder 107 in the steam turbine 25 through a high-temperature steam pipe 20. The reheater pipe set 9 adopts a double reheat method so as to improve the efficiency of the power generating unit. A denitration system 21 and an air preheater 23 are arranged inside the tail downlink flue 22 from top to bottom, and a tail flue gas outlet 24 is formed on the lower part of the side wall of the tail downlink flue 22. A hearth arch 202 is arranged above the hearth flue gas outlet 201 on the side wall of the hearth 4 to make the air flow of the flue gas more uniform and reduce the scouring to the convection heating surfaces. Wall burners 5 are arranged on the side wall of the hearth 4. Top burners 6 are arranged on the top of the hearth 4. The convection heating surfaces in the middle uplink flue 14 are arranged in parallel, and the superheater pipe set 8 and reheater pipe set 9 of the convection heating surfaces are divided into three convection heating surface sets, and several division walls 18 are arranged between the three convection heating surface sets, and a flue gas damper 15 is arranged behind the division walls 18. The hearth 4 is enclosed by the water cooled wall 3, which is a water cooled wall with spiral pipe coils, a rifled vertical pipe water cooled wall, and a normal vertical pipe water cooled wall or the combination of any two of them, besides, the overall flowing direction of water cooled working medium in the water cooled wall is from top to bottom or from bottom to top. The platen heating surface 2 is a superheated steam heating surface, a reheated steam heating surface, an evaporating heating surface or their combination. The middle uplink flue 14 is enclosed by a wall enclosure heating surface 7 or by a guard board. A slag discharge machine 19 is arranged below the slag discharge opening 1. A first dust discharge opening 101 is formed at the bottom of the middle uplink flue 14, and a second dust discharge opening 102 is formed at the bottom of the tail downlink flue 22.

Second Embodiment

Figure 2:
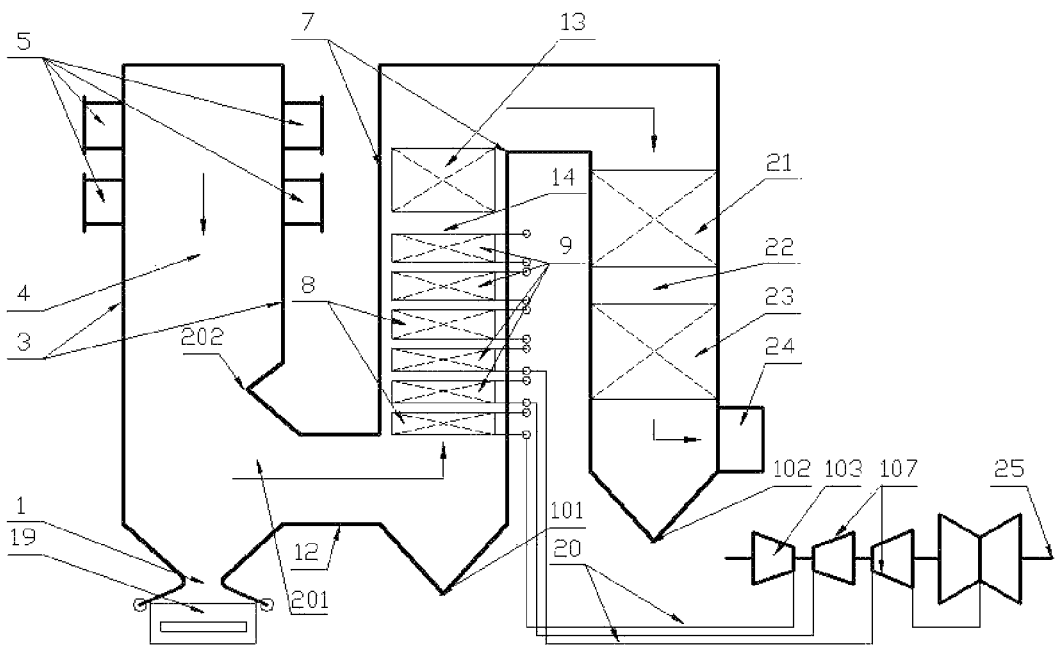
FIG. 2 is a diagram of an arrangement structure suitable for an inverted pulverized coal boiler with ultra-high steam temperature steam parameters in the second embodiment of the disclosure, the inside arrows representing the flowing direction of the flue gas.

As shown in FIG. 2, the arrangement structure suitable for an inverted pulverized coal boiler with ultra-high steam temperature steam parameters includes a hearth 4 at the bottom outlet of which a slag discharge opening 1 is formed. A hearth flue gas outlet 201 is formed on the lower part of the side wall of the hearth 4 and is communicated with one end of the hearth outlet horizontal flue 12, while the other end of the hearth outlet horizontal flue 12 is communicated with a middle uplink flue 14, and the top of the middle uplink flue 14 is communicated with that of a tail downlink flue 22; and convection heating surfaces consisting of an economizer 13, a superheater pipe set 8 and a reheater pipe set 9 are arranged inside the middle uplink flue 14, wherein a final superheater and a final reheater are respectively communicated with a corresponding high-pressure cylinder 103 and a corresponding medium-pressure cylinder 107 in the steam turbine 25 through a high-temperature steam pipe 20. The reheater pipe set 9 adopts a double reheat method. A denitration system 21 and an air preheater 23 are arranged inside the tail downlink flue 22 from top to bottom, and a tail flue gas outlet 24 is formed on the lower part of the side wall of the tail downlink flue 22. A hearth arch 202 is arranged above the hearth flue gas outlet 201 on the side wall of the hearth 4. Wall burners 5 are arranged on the side wall of the hearth 4. The convection heating surfaces in the middle uplink flue 14 are arranged in series. The hearth 4 is enclosed by the water cooled wall 3, which is a water cooled wall with spiral pipe coils, a rifled vertical pipe water cooled wall, and a normal vertical pipe water cooled wall or the combination of any two of them, besides, the overall flowing direction of water cooled working medium in the water cooled wall is from top to bottom or from bottom to top. The middle uplink flue 14 is enclosed by a wall enclosure heating surface 7 or by a guard board. A slag discharge machine 19 is arranged below the slag discharge opening 1. A first dust discharge opening 101 is formed at the bottom of the middle uplink flue 14, and a second dust discharge opening 102 is formed at the bottom of the tail downlink flue 22.

Third Embodiment

Figure 3:
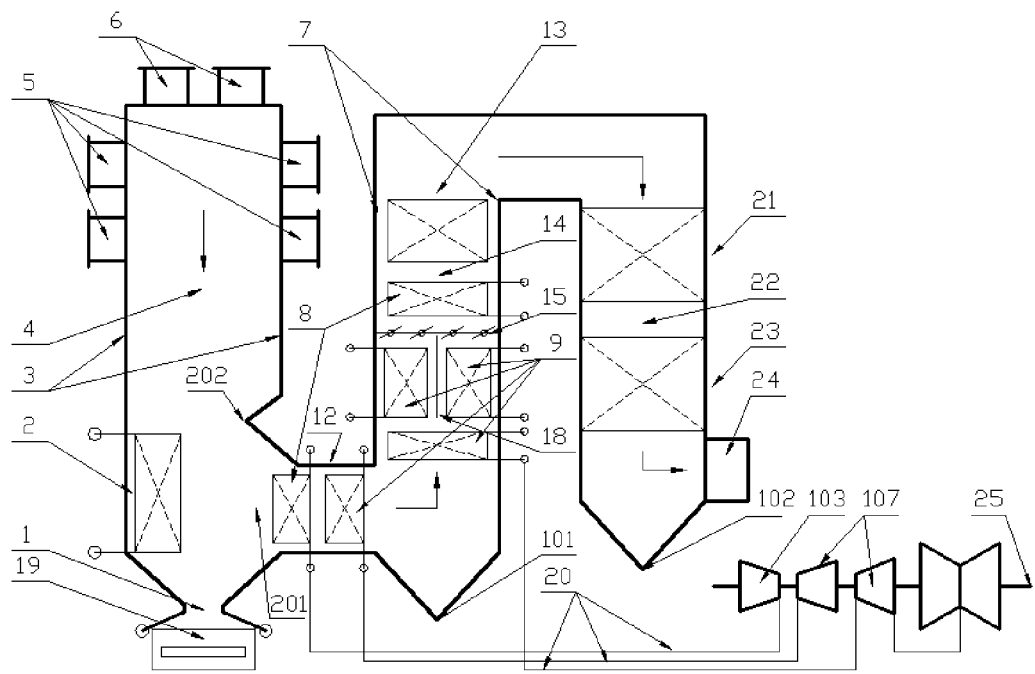
FIG. 3 is a diagram of an arrangement structure suitable for an inverted pulverized coal boiler with ultra-high steam temperature steam parameters in the third embodiment of the disclosure, the inside arrows representing the flowing direction of the flue gas.

As shown in FIG. 3, the arrangement structure suitable for an inverted pulverized coal boiler with ultra-high steam temperature steam parameters provided by the disclosure includes a hearth 4 at the bottom outlet of which a slag discharge opening 1 is formed. A hearth flue gas outlet 201 is formed on the lower part of the side wall of the hearth 4 and is communicated with one end of the hearth outlet horizontal flue 12, while the other end of the hearth outlet horizontal flue 12 is communicated with a middle uplink flue 14, and the top of the middle uplink flue 14 is communicated with that of a tail downlink flue 22; a platen heating surface 2 is arranged on the lower part of the inside of the hearth 4, and convection heating surfaces consisting of an economizer 13, a superheater pipe set 8 and a reheater pipe set 9 are arranged inside the hearth outlet horizontal flue 12 and the middle uplink flue 14, wherein a final superheater and a final reheater are respectively communicated with a corresponding high-pressure cylinder 103 and a corresponding medium-pressure cylinder 107 in the steam turbine 25 through a high-temperature steam pipe 20. The reheater pipe set 9 adopts a double reheat method. Partial convection heating surfaces are arranged in the hearth outlet horizontal flue 12 to reduce the height of the middle uplink flue 14 and the tail downlink flue 22. A denitration system 21 and an air preheater 23 are arranged inside the tail downlink flue 22 from top to bottom, and a tail flue gas outlet 24 is formed on the lower part of the side wall of the tail downlink flue 22. A hearth arch 202 is arranged above the hearth flue gas outlet 201 on the side wall of the hearth 4. Wall burners 5 are arranged on the side wall of the hearth 4. Top burners 6 are arranged on the top of the hearth 4. The convection heating surfaces in the middle uplink flue 14 are arranged in the combined way of parallel and series, partial heating surfaces in the reheater pipe set 9 of the convection heating surfaces are divided into two convection heating surface sets; a division wall 18 is arranged between the two sets of convection heating surfaces, and a flue gas damper 15 is arranged behind the division wall 18. The hearth 4 is enclosed by the water cooled wall 3, which is a water cooled wall with spiral pipe coils, a rifled vertical pipe water cooled wall, and a normal vertical pipe water cooled wall or the combination of any two of them, besides, the overall flowing direction of water cooled working medium in the water cooled wall is from top to bottom or from bottom to top. The platen heating surface 2 is a superheated steam heating surface, a reheated steam heating surface, an evaporating heating surface or their combination. The middle uplink flue 14 is enclosed by a wall enclosure heating surface 7 or by a guard board. A slag discharge machine 19 is arranged below the slag discharge opening 1. A first dust discharge opening 101 is formed at the bottom of the middle uplink flue 14, and a second dust discharge opening 102 is formed at the bottom of the tail downlink flue 22.

Fourth Embodiment

Figure 4:
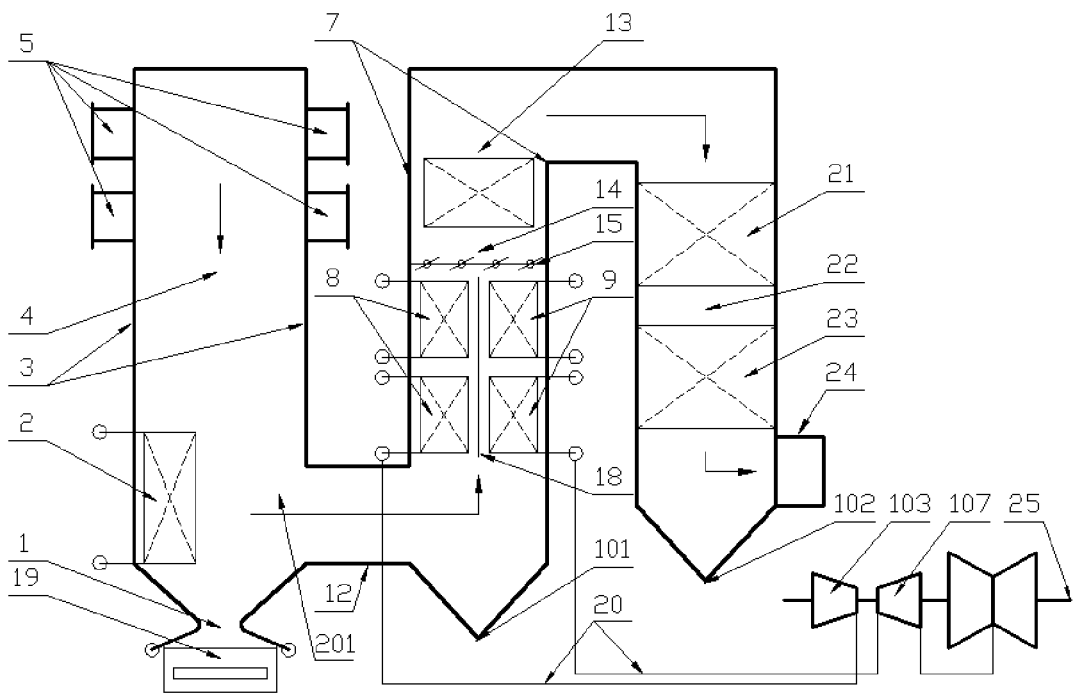
FIG. 4 is a diagram of an arrangement structure suitable for an inverted pulverized coal boiler with ultra-high steam temperature steam parameters in the fourth embodiment of the disclosure, the inside arrows representing the flowing direction of the flue gas.

As shown in FIG. 4, the arrangement structure suitable for an inverted pulverized coal boiler with ultra-high steam temperature steam parameters includes a hearth 4 at the bottom outlet of which a slag discharge opening 1 is formed. A hearth flue gas outlet 201 is formed on the lower part of the side wall of the hearth 4 and is communicated with one end of the hearth outlet horizontal flue 12, while the other end of the hearth outlet horizontal flue 12 is communicated with a middle uplink flue 14, and the top of the middle uplink flue 14 is communicated with that of a tail downlink flue 22; a platen heating surface 2 is arranged on the lower part of the inside of the hearth 4, and convection heating surfaces consisting of an economizer 13, a superheater pipe set 8 and a reheater pipe set 9 are arranged inside the middle uplink flue 14, wherein a final superheater and a final reheater are respectively communicated with a corresponding high-pressure cylinder 103 and a corresponding medium-pressure cylinder 107 in the steam turbine 25 through a high-temperature steam pipe 20. The reheater pipe set 9 adopts a single reheat method. A denitration system 21 and an air preheater 23 are arranged inside the tail downlink flue 22 from top to bottom, and a tail flue gas outlet 24 is formed on the lower part of the side wall of the tail downlink flue 22. Wall burners 5 are arranged on the side wall of the hearth 4. The convection heating surfaces in the middle uplink flue 14 are arranged in parallel, and the superheater pipe set 8 and the reheater pipe set 9 of the convection heating surfaces are divided into two convection heating surface sets; a division wall 18 is arranged between the two sets of convection heating surfaces, and a flue gas damper 15 is arranged behind the division wall 18. The hearth 4 is enclosed by the water cooled wall 3, which is a water cooled wall with spiral pipe coils, a rifled vertical pipe water cooled wall, and a normal vertical pipe water cooled wall or the combination of any two of them, besides, the overall flowing direction of water cooled working medium in the water cooled wall is from top to bottom or from bottom to top. The middle uplink flue 14 is enclosed by a wall enclosure heating surface 7 or by a guard board. A slag discharge machine 19 is arranged below the slag discharge opening 1. A first dust discharge opening 101 is formed at the bottom of the middle uplink flue 14, and a second dust discharge opening 102 is formed at the bottom of the tail downlink flue 22.

Fifth Embodiment

Figure 5:
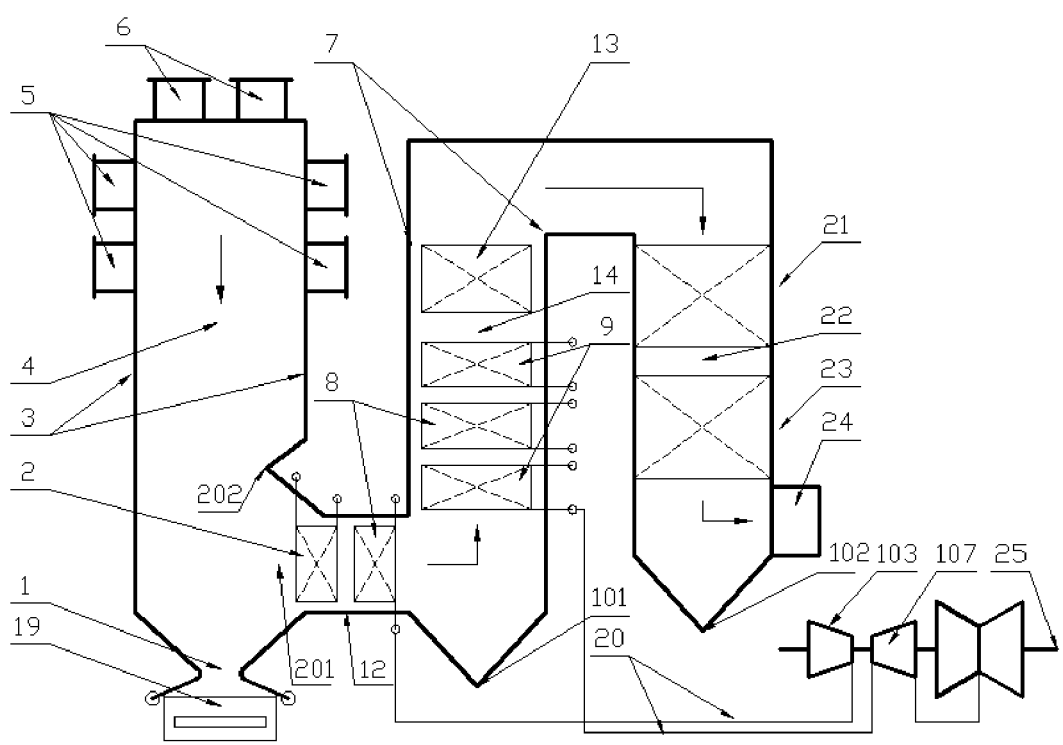
FIG. 5 is a diagram of an arrangement structure suitable for an inverted pulverized coal boiler with ultra-high steam temperature steam parameters in the fifth embodiment of the disclosure, the inside arrows representing the flowing direction of the flue gas.

As shown in FIG. 5, the arrangement structure suitable for an inverted pulverized coal boiler with ultra-high steam temperature steam parameters includes a hearth 4 at the bottom outlet of which a slag discharge opening 1 is formed. A hearth flue gas outlet 201 is formed on the lower part of the side wall of the hearth 4 and is communicated with one end of the hearth outlet horizontal flue 12, while the other end of the hearth outlet horizontal flue 12 is communicated with a middle uplink flue 14, and the top of the middle uplink flue 14 is communicated with that of a tail downlink flue 22; a platen heating surface 2 is arranged on one side of the lower part of the inside of the hearth 4 adjacent to the hearth outlet horizontal flue 12, and convection heating surfaces consisting of an economizer 13, a superheater pipe set 8 and a reheater pipe set 9 are arranged inside the hearth outlet horizontal flue 12 and the middle uplink flue 14, wherein a final superheater and a final reheater are respectively communicated with a corresponding high-pressure cylinder 103 and a corresponding medium-pressure cylinder 107 in the steam turbine 25 through a high-temperature steam pipe 20. The reheater pipe set 9 adopts a single reheat method. Partial convection heating surfaces are arranged inside the hearth outlet horizontal flue 12 to reduce the height of the middle uplink flue 14 and the tail downlink flue 22. A denitration system 21 and an air preheater 23 are arranged inside the tail downlink flue 22 from top to bottom, and a tail flue gas outlet 24 is formed on the lower part of the side wall of the tail downlink flue 22. Wall burners 5 are arranged on the side wall of the hearth 4. Top burners 6 are arranged on the top of the hearth 4. The convection heating surfaces in the middle uplink flue 14 are arranged in series. The hearth 4 is enclosed by the water cooled wall 3, which is a water cooled wall with spiral pipe coils, a rifled vertical pipe water cooled wall, and a normal vertical pipe water cooled wall or the combination of any two of them, besides, the overall flowing direction of water cooled working medium in the water cooled wall is from top to bottom or from bottom to top. The platen heating surface 2 is a superheated steam heating surface, a reheated steam heating surface, an evaporating heating surface or their combination. The middle uplink flue 14 is enclosed by a wall enclosure heating surface 7 or by a guard board. A slag discharge machine 19 is arranged below the slag discharge opening 1. A first dust discharge opening 101 is formed at the bottom of the middle uplink flue 14, and a second dust discharge opening 102 is formed at the bottom of the tail downlink flue 22.

The working principle of the disclosure is: flue gas flows from top to bottom in the hearth 4, then enters the middle uplink flue 14 through the hearth outlet horizontal flue 12, further enters the tail downlink flue 22 from the top of the middle uplink flue 14 through the convection heating surfaces in the middle uplink flue 14, and finally flows out of the tail flue gas outlet 24 sequentially through the denitration system 21 and the air preheater 23.

The above are only preferred embodiments of the disclosure and not used for limiting the disclosure. For those skilled in the art, the disclosure may have various modifications and changes. Any modifications, equivalent replacements, improvements and the like within the spirit and principle of the disclosure shall fall within the scope of protection of the disclosure.

The invention claimed is:

1. An arrangement structure suitable for an inverted pulverized coal boiler with ultra-high steam temperature steam parameters, the arrangement structure comprising:
   a hearth comprising a bottom outlet including a slag discharge opening, wherein wall burners are arranged on an upper part of a side wall of the hearth or top burners are arranged on a top of the hearth; a lower part of the side wall of the hearth includes a hearth flue gas outlet, and the hearth flue gas outlet is in flue gas communication with one end of a hearth outlet horizontal flue, while an other end of the hearth outlet horizontal flue is in flue gas communication with a bottom of a middle uplink flue, and a top of the middle uplink flue is in flue gas communication with a top of a tail downlink flue;
   a platen heating surface is arranged within a lower interior portion of the hearth, and convection heating surfaces including an economizer, a superheater pipe set and a reheater pipe set are arranged inside the middle uplink flue, wherein a final superheater of the superheater pipe set is arranged in a lower part of the middle uplink flue so as to supply high-temperature steam through at least one high-temperature steam pipe to a high-pressure cylinder of a steam turbine, a final reheater of the reheater pipe set is arranged in the lower part of the middle uplink flue so as to supply high-temperature steam through at least one high-temperature steam pipe to a medium-pressure cylinder of a steam turbine, a denitration system and an air preheater are arranged inside the tail downlink flue with the denitration system arranged above the air preheater, and a tail flue gas outlet is formed on a lower part of a side wall of the tail downlink flue.

2. The arrangement structure according to claim 1, wherein a hearth arch is arranged along the side wall of the hearth above the hearth flue gas outlet.

3. An arrangement structure suitable for an inverted pulverized coal boiler with ultra-high steam temperature steam parameters, the arrangement structure comprising:
   a hearth including a side wall and a hearth flue gas outlet arranged on a lower part of the side wall, wherein wall burners are arranged on an upper part of the side wall of the hearth or top burners are arranged on a top of the hearth; the hearth flue gas outlet is in flue gas communication with one end of a hearth outlet horizontal flue, while an other end of the hearth outlet horizontal flue is in flue gas communication with a bottom of a middle uplink flue, and a top of the middle uplink flue is horizontally connected with a top of a tail downlink flue.

4. The arrangement structure according to claim 3, wherein a slag discharge opening is formed at the bottom of the hearth, and convection heating surfaces including at least portions of an economizer, a superheater pipe set and a reheater pipe set are arranged inside the middle uplink flue, wherein a final superheater of the superheater pipe set is arranged in a lower part of the middle uplink flue so as to supply high-temperature steam through at least one high-temperature steam pipe to a high-pressure cylinder of a steam turbine, a final reheater of the reheater pipe set is arranged in the lower part of the middle uplink flue so as to supply high-temperature steam through at least one high-temperature steam pipe to a medium-pressure cylinder of a steam turbine, a denitration system and an air preheater are arranged inside the tail downlink flue with the denitration system arranged above the air preheater, and a tail flue gas outlet is formed on a lower part of a side wall of the tail downlink flue.

5. The arrangement structure according to claim 4, wherein a platen heating surface is arranged within a lower interior portion of the hearth.

6. The arrangement structure suitable according to claim 4, wherein convection heating surfaces including portions of at least one of a superheater pipe set and a reheater pipe set are arranged inside at least one of a hearth outlet horizontal flue and the tail downlink flue.

7. The arrangement structure according to claim 5, wherein a hearth arch is arranged along the side wall of the hearth above the hearth flue gas outlet.

8. The arrangement structure according to claim 4, wherein the convection heating surfaces in the middle uplink flue are arranged in series or in parallel.

9. The arrangement structure according to claim 8, wherein the economizer, superheater pipe set, and reheater pipe set of the convection heating surfaces are divided into two or more parallel convection heating surface sets, a plurality of division walls are arranged between the two or more parallel convection heating surface sets, and a flue gas damper is arranged above the plurality of division walls.

10. The arrangement structure according to claim 3, wherein at least a portion of the hearth is enclosed by a water cooled wall comprising at least one of spiral pipe coils, a rifled vertical pipe water cooled wall, and a normal vertical pipe water cooled wall, and the overall flowing direction of water cooled working medium in the water cooled wall is from top to bottom or from bottom to top.

11. The arrangement structure according to claim 4, wherein the platen heating surface comprises at least one of a superheated steam heating surface, a reheated steam heating surface, and an evaporating heating surface.

12. The arrangement structure according to claim 3, wherein the middle uplink flue is enclosed by a wall enclosure heating surface or a guard plate.

13. The arrangement structure according to claim 4, wherein a slag discharge machine is arranged below the slag discharge opening.

14. The arrangement structure according to claim 5, wherein a first dust discharge opening is formed at a bottom of the middle uplink flue, and a second dust discharge opening is formed at a bottom of the tail downlink flue.

15. The arrangement structure according to claim 5, wherein the convection heating surfaces in the middle uplink flue are arranged in series or in parallel.

16. The arrangement structure according to claim 5, wherein at least a portion of the hearth is enclosed by a water cooled wall comprising at least one of spiral pipe coils, a rifled vertical pipe water cooled wall, and a normal vertical pipe water cooled wall, and the overall flowing direction of water cooled working medium in the water cooled wall is from top to bottom or from bottom to top.

17. The arrangement structure according to claim 5, wherein the middle uplink flue is enclosed by a wall enclosure heating surface or a guard plate.

* * * * *